(12) United States Patent
     Pi

(10) Patent No.: US 8,711,783 B2
(45) Date of Patent: Apr. 29, 2014

(54) METHOD AND APPARATUS FOR COORDINATING HOPPING OF RESOURCES IN WIRELESS COMMUNICATION SYSTEMS

(75) Inventor: Zhouyue Pi, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1434 days.

(21) Appl. No.: 11/756,024

(22) Filed: May 31, 2007

(65) Prior Publication Data

US 2008/0130559 A1    Jun. 5, 2008

Related U.S. Application Data

(60) Provisional application No. 60/868,160, filed on Dec. 1, 2006.

(51) Int. Cl.
    *H04W 4/00*    (2009.01)
(52) U.S. Cl.
    USPC ........ 370/329; 370/330; 370/344; 455/452.1; 455/455; 455/464
(58) Field of Classification Search
    USPC ............... 370/329, 330, 344; 455/450, 452.1, 455/455, 464
    See application file for complete search history.

(56) References Cited

U.S. PATENT DOCUMENTS

| | | | |
|---|---|---|---|
| 2005/0272432 A1* | 12/2005 | Ji et al. | 455/449 |
| 2006/0133262 A1* | 6/2006 | Sutivong et al. | 370/209 |
| 2006/0148408 A1* | 7/2006 | Cho et al. | 455/67.7 |
| 2006/0209754 A1* | 9/2006 | Ji et al. | 370/329 |
| 2007/0025460 A1* | 2/2007 | Budianu et al. | 375/260 |
| 2007/0201398 A1* | 8/2007 | Yang et al. | 370/329 |
| 2007/0218954 A1* | 9/2007 | Garrett et al. | 455/562.1 |
| 2007/0223440 A1* | 9/2007 | Ho et al. | 370/342 |
| 2007/0254728 A1* | 11/2007 | Moallemi et al. | 455/574 |
| 2008/0014861 A1* | 1/2008 | Li et al. | 455/3.01 |
| 2008/0014951 A1* | 1/2008 | Laroia et al. | 455/450 |
| 2008/0031197 A1* | 2/2008 | Wang et al. | 370/331 |
| 2008/0056183 A1* | 3/2008 | Gorokhov et al. | 370/329 |
| 2008/0075032 A1* | 3/2008 | Balachandran et al. | 370/317 |
| 2008/0123593 A1* | 5/2008 | Fujita et al. | 370/330 |
| 2008/0219235 A1* | 9/2008 | Ma et al. | 370/344 |
| 2009/0022098 A1* | 1/2009 | Novak et al. | 370/329 |
| 2009/0060081 A1* | 3/2009 | Zhang et al. | 375/267 |

* cited by examiner

*Primary Examiner* — Jinsong Hu
*Assistant Examiner* — Qun Shen

(57) ABSTRACT

A method and apparatus for coordinating the resource assignment of a plurality of channel segments in a wireless communication system are disclosed. The method includes the steps of determining a number of resources available, determining a number of channel segments to include in a frame, determining a number of resource zones to be used for resource assignment of the plurality of channel segments, assigning each channel segment of the number of channel segments to a resource zone of the number of resource zones, and selecting a resource from the number of resources for transmitting said each channel segment in said resource zone.

23 Claims, 3 Drawing Sheets

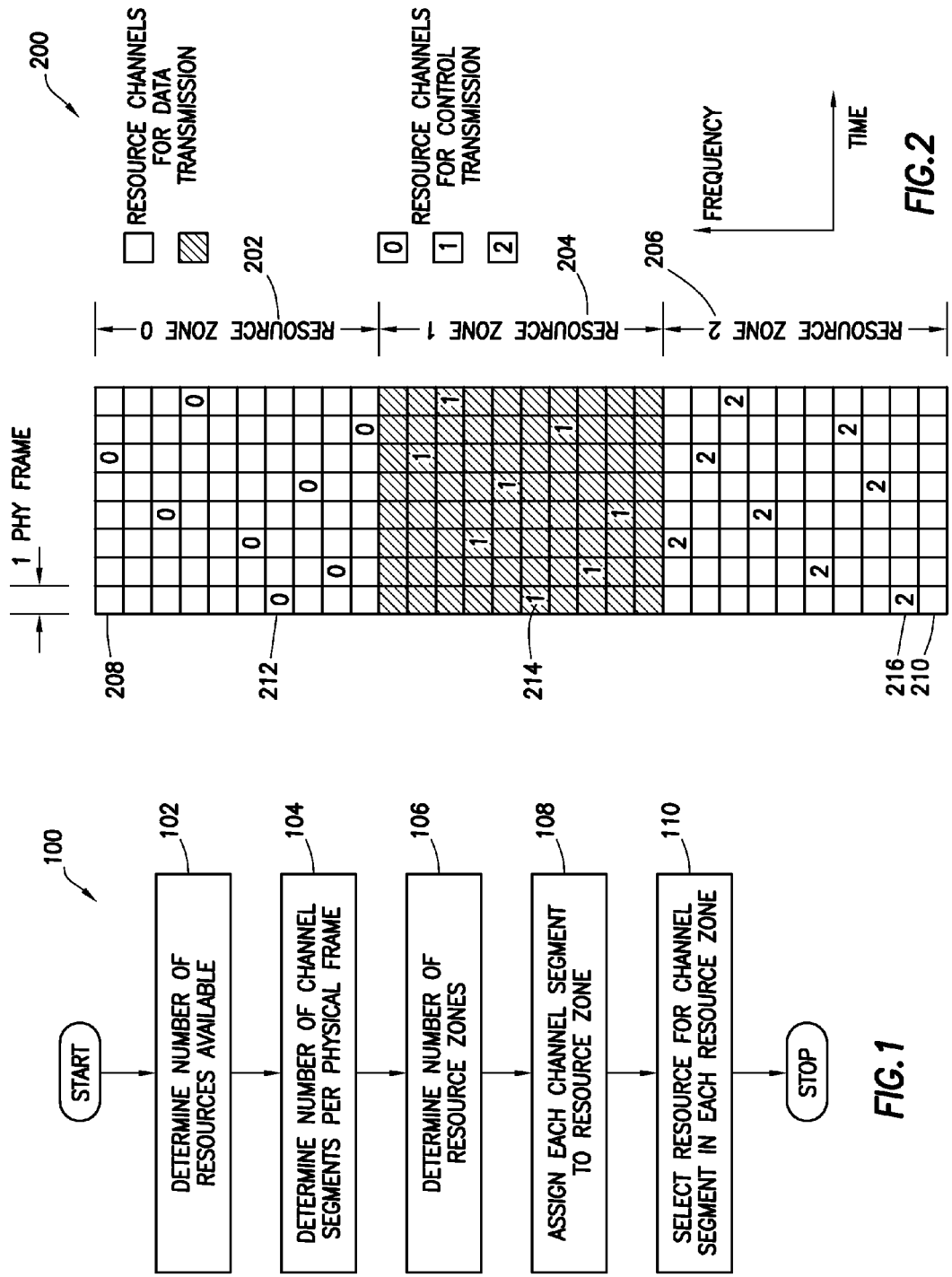

METHOD AND APPARATUS FOR COORDINATING HOPPING OF RESOURCES IN WIRELESS COMMUNICATION SYSTEMS

CROSS-REFERENCE TO RELATED APPLICATION AND CLAIM FOR PRIORITY

The present application is related to U.S. Provisional Patent Application No. 60/868,160, entitled "COORDINATED HOPPING OF MULTIPLE HOPPING SEQUENCES," filed on Dec. 1, 2006, which is assigned to the assignee of the present application. The subject matter disclosed in U.S. Provisional Patent Application No. 60/868,160 is incorporated by reference into the present application as if fully set forth herein. The present application hereby claims priority, under 35 U.S.C. §119(e), to U.S. Provisional Patent Application No. 60/868,160.

FIELD OF THE INVENTION

The invention relates to the telecommunications field, and more particularly, but not exclusively, to a method and apparatus for coordinating the hopping of resources in wireless communication systems.

BACKGROUND OF THE INVENTION

In certain wireless communication systems, such as, for example, Orthogonal Frequency Division Multiple Access (OFDMA) systems, hopping sequences are used pervasively in many aspects of system design and operation. For example, the forward and reverse link data channel transmissions and forward and reverse link control channels in OFDMA systems are often hopped in the frequency domain. In this regard, the term "hopping" refers to the pattern of frequency assignments being made. In general, hopping increases the frequency diversity experienced by a particular transmission, and averages out the level of interference perceived with respect to that transmission.

When a channel spans over multiple units of physical resources, the channel can be divided into a plurality of channel segments, with each channel segment transmitted over a subset of the physical resources allocated to the channel. The resources assigned to transmission of these channel segments can be derived based on a plurality of hopping sequences. For example, one hopping sequence can be used to derive the resource assignment for each channel segment. The "resource assignment" of a channel segment is referred to as the "hopping pattern", or "hopping", of that channel segment. With respect to this application, the terms "resource assignment" of a channel segment and "hopping" of a channel segment have the same meaning and are used interchangeably. In the existing systems, when multiple resources are assigned to a given channel, the hopping patterns of the channel segments are typically uncoordinated, except for the fact that collisions of the hopping patterns for these channel segments are avoided. In fact, it is a commonly accepted practice to provide hopping patterns for these multiple channel segments that are as random and independent as possible, in order to achieve good performance. However, this practice may not be advantageous for transmissions of certain types of information (e.g., control channel transmissions) that are encoded over multiple resources but within one frame. In this case, the frequency diversity within a frame should be maximized to improve the performance of the control channels involved. Therefore, a pressing need exists for an approach that can be used for coordinating the hopping of multiple channel segments, and improving system performance for certain transmissions, such as control channel transmissions or other types of transmissions.

SUMMARY OF THE INVENTION

In a first example embodiment, a method for coordinating the resource assignment of a plurality of channel segments in a wireless communication system is provided. The method includes the steps of determining a number of resources available, determining a number of channel segments to include in a frame, determining a number of resource zones to be used for hopping the plurality of channel segments, assigning each channel segment of the number of channel segments to a resource zone of the number of resource zones, and selecting a resource from the number of resources for transmitting said each channel segment in said resource zone.

In a second example embodiment, a method is provided for coordinating the resource assignment of K control channel segments, which are also referred to as "control tiles", over N resource units in a wireless communication system. The method includes the steps of defining a distance value, $D_i$, associated with a frequency separation between an $(i^{th}-1)$ control tile and an $i^{th}$ control tile, for $i=0, \ldots, K-1$, defining a first resource unit identifier of a first control tile $\mathbf{0}$ as $B_0$, defining a second resource unit identifier of a second control tile $\mathbf{1}$ as $B_1=\mathrm{mod}((B_0+D_1), N)$, where $\mathrm{mod}(x, N)$ represents a remainder of x divided by N, determining a first distance value, $D_1$, for a first control tile located in a physical frame, determining a second distance value, $D_2$, for a second control tile located in the physical frame, and deriving a location in the physical frame for a third control tile based on the first distance value, $D_1$, the second distance value, $D_2$, and a relationship between the first resource unit identifier and the second resource unit identifier.

In a third example embodiment, an apparatus for coordinating the resource assignment of a plurality of channel segments in a wireless communication system is provided. The apparatus includes a transmission unit, and a frame processing unit coupled to the transmission unit. The frame processing unit is configured to determine how many frequency resource units are available for transmission, determine how many channel segments to include in a physical frame, determine how many resource zones are to be used for hopping the plurality of channel segments, assign each channel segment to a resource zone, select a resource unit for said each channel segment in said resource zone, and couple the resource units including said each channel segment in said resource zone to the transmission unit.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a flow chart depicting a method for coordinating the hopping of a plurality of channel segments in a wireless communication system, in accordance with a first example embodiment of the present invention;

FIG. 2 is a pictorial diagram depicting a hopping sequence pattern that illustrates a method for coordinating the hopping of a plurality of channel segments, in accordance with the exemplary embodiment shown in FIG. 1;

DETAILED DESCRIPTION OF PREFERRED EMBODIMENT

Figure 3:
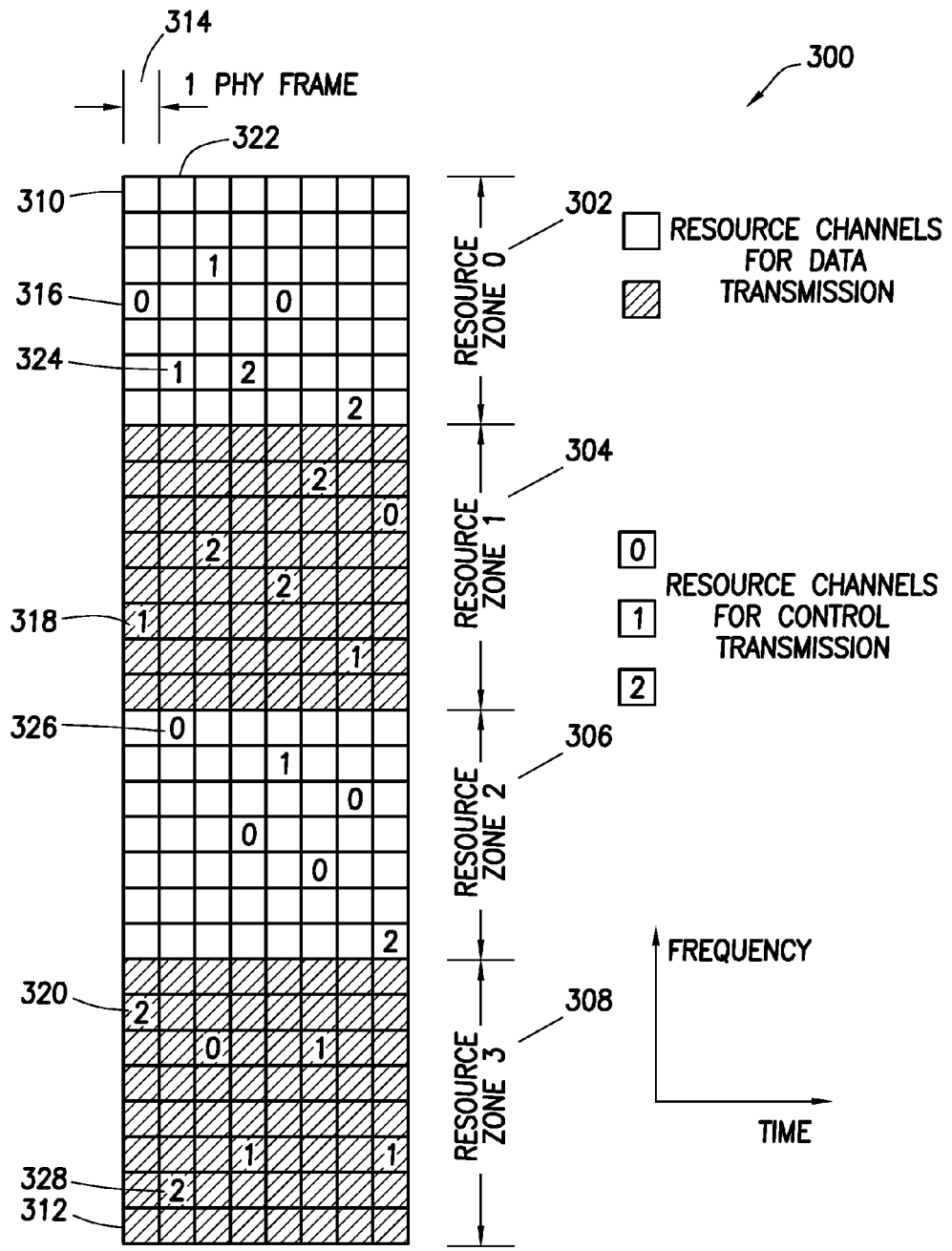
FIG. 3 is a pictorial diagram depicting an exemplary hopping sequence pattern that illustrates a method for coordinating the hopping of a plurality of channel segments, in accordance with a second example embodiment of the present invention.

Essentially, for one or more example embodiments of the present invention, a method and apparatus for coordinating the hopping of a plurality of hopping sequences are provided. For example, a method for coordinating hopping is provided for improving the performance of forward link control segments in OFDMA systems. Notably, in some embodiments, such forward link control segments can include, but are not limited to, forward shared control channels, forward acknowledgment channels, forward power control channels, forward start-of-packet channels, forward fast other sector interference channels, forward interference over thermal channels, and forward pilot quality indicator channels, which are disclosed in the 3$^{rd}$ Generation Partnership Project 2 (3GPP2) joint framework proposal for the physical layer of the air interface specification evolution phase 2. Some embodiments may also include coordinating the hopping of reverse link control channels, such as, for example, the reverse acknowledgment channel also disclosed in the 3GPP2 proposal. Note that the exemplary use of the forward link control segments or reverse link control channels in some embodiments is primarily for illustrative purposes, and the present invention is not intended to be so limited. For example, the inventive methods for coordinating the hopping of a plurality of control channel segments described herein can be implemented for other suitable segments, channels and/or systems where hopping or similar other techniques may be used to improve the performance of the wireless systems involved.

For one or more example embodiments of the present invention, the spectrum involved may be divided into a plurality of resource zones (e.g., may be referred to as resource hopping zones or forward link control segment hopping zones). Preferably, for some embodiments, the resource zones may be disjoint or non-overlapping. However, for other embodiments, some of the resource zones may overlap other resource zones. In any event, for illustrative purposes and clarity, each channel segment of a control channel may be referred to as a control tile, and each control tile may select a resource zone in which that control tile can be hopped. For example, the control tile may be a forward link control segment tile as described in the 3GPP2 specification.

In a first example embodiment of the present invention, the process for selecting the resource zones for the plurality of control tiles is coordinated so that the control tiles are spread out over the available resource zones to achieve a suitable amount of diversity. For example, assume there are "N" resources available, and the control channel includes "K" control tiles in each physical frame. In this case, the resources are divided into K resource zones, and each resource zone includes N/K resources. Also, for this embodiment, each control tile is to be hopped within a resource zone, and a K-bit zone hopping pattern is generated for the K control tiles. As one example, if a zone hopping pattern is defined as "201", this 3-bit (K=3) description means that control tile 0 is to be transmitted in resource zone 1, control tile 1 is to be transmitted in resource zone 2, and control tile 2 is to be transmitted in resource zone 0. After a resource zone is determined for each control tile, a resource unit within each resource zone can be selected for the corresponding control tile in that resource zone. In this example embodiment, each control tile is preferably hopped independently within the selected resource zone so that collisions with the control tiles of other sectors are minimized.

With reference now to the figures, FIG. 1 is a flow chart depicting a method 100 for coordinating the hopping of a plurality of channel segments in a wireless communication system, in accordance with the above-described first example embodiment of the present invention. For this example embodiment, method 100 begins by (e.g., using a digital processor associated with an OFDMA system transmission unit) determining the number of resources available (step 102). For example, the plurality of resources may be a plurality of frequency resource channels. Next, the number of channel segments to be transmitted in each physical frame is determined (step 104). For example, the channel segments may be control tiles. The number of resource zones to be used is then determined (step 106). For this example embodiment, the resource zones can be resource hopping zones or forward link control segment hopping zones, and the number of resource zones may be equal to the number of control tiles determined in step 104. Note however, as described below with respect to a different embodiment, the number of resource zones also may be different than the number of control tiles. Next, each control tile is assigned to a resource zone (step 108). For this example embodiment, for each physical frame, each control tile is assigned to a different resource zone. A resource to be used for transmitting each control tile is then selected in each resource zone (step 110). For this example embodiment, a respective frequency resource channel is selected for transmitting each control tile in each resource hopping zone.

In a different aspect of the above-described embodiment, for the more general case in which the number of resources, N, may not be evenly divisible by the number of control tiles, K, the plurality of resource zones may be defined as follows:

$$\text{Resource zone } i = \left\{ \left\lfloor \frac{N \cdot i}{K} \right\rfloor, \left\lfloor \frac{N \cdot i}{K} \right\rfloor + 1, \ldots \left\lfloor \frac{N(i+1)}{K} \right\rfloor - 1 \right\},$$
$$i = 0, 1, \ldots K - 1.$$

Note that $\lfloor x \rfloor$ means the largest integer that is smaller than or equal to x.

FIG. 2 is a pictorial diagram depicting a hopping sequence pattern 200 that illustrates a method for coordinating the hopping of a plurality of channel segments, in accordance with the exemplary embodiment shown in FIG. 1. For this example embodiment, the resources involved are frequency resource channels, N is equal to 30, and K is equal to 3. In other words, hopping sequence pattern 200 includes 3 resource zones 202, 204, 206, and 30 frequency resource channels. The 1$^{st}$ frequency resource channel is indicated by the numeral 208, and the 30$^{th}$ frequency resource channel is indicated by the numeral 210. Thus, for this example embodiment, the frequency resource channels are divided into 3 resource zones 202, 204, 206, and each resource zone 202, 204, 206 includes 10 of the frequency resource channels. For illustrative purposes, control tiles are used as channel segments. In accordance with the above-described method, note that for each physical frame, control tile 0 (indicated, for example, by numeral 212) is hopped within resource zone 0 (202), control tile 1 (indicated, for example, by numeral 214) is hopped within resource zone 1 (204), and control tile 2 (indicated, for example, by numeral 216) is hopped within resource zone 2 (206). This coordinated method of hopping guarantees that the 3 control tiles will not be located too closely in frequency in any frame, so that a certain level of frequency diversity is always guaranteed.

In a second example embodiment, as mentioned above, the number of resource zones may be different than the number of control tiles. For example, assume that there are N resources involved, the control channel uses K control tiles in every physical frame, and the resources are divided into M resource zones. For each transmission of the control channel, one resource zone is selected for each control tile. In this case, the number of selected resource zones may or may not be the same as the number of control tiles, and a plurality of control tiles may be transmitted in one resource hopping zone. For this example embodiment, the process of selecting the resource zones for hopping is coordinated so that a certain level of frequency diversity is achieved. For example, a suitable selection rule can be defined so that: (1) each control tile is to be transmitted in a different resource zone; (2) at least one control tile is to be transmitted in a different resource zone than the other control tiles; or (3) at least more than one resource zone is to be selected for the transmission of control tiles. In any event, each control tile is hopped within a resource zone, and the hopping pattern for each control tile within a resource zone may or may not be coordinated. An illustrative example of this method is depicted in FIG. 3.

FIG. 3 is a pictorial diagram depicting an exemplary hopping sequence pattern 300 that illustrates a method for coordinating the hopping of a plurality of channel segments, in accordance with the above-described second example embodiment of the present invention. For this example embodiment, the resources involved are frequency resource channels, N is equal to 30, and the 30 resource channels are divided into M=4 resource zones. In other words, hopping sequence pattern 300 includes 4 resource zones 302, 304, 306, 308, and 30 frequency resource channels. The 1$^{st}$ frequency resource channel is indicated by the numeral 310, and the 30$^{th}$ frequency resource channel is indicated by the numeral 312. Thus, for this example embodiment, the frequency resource channels are divided into 4 resource zones 302, 304, 306, 308, each of resource zones 302, 306 includes 7 frequency resource channels, and each of resource zones 304, 308 includes 8 frequency resource channels. In this example embodiment, the plurality of resource zones may be defined as:

$$\text{Resource zone } i = \left\{ \left\lfloor \frac{N \cdot i}{M} \right\rfloor, \left\lfloor \frac{N \cdot i}{M} \right\rfloor + 1, \ldots \left\lfloor \frac{N(i+1)}{M} \right\rfloor - 1 \right\},$$

$$i = 0, 1, \ldots M - 1.$$

Again, note that $\lfloor x \rfloor$ means the largest integer that is smaller than or equal to x.

Notably, for this example embodiment, the control channel is transmitted over K=3 control tiles. In each physical frame, 3 different resource zones are selected, and one resource zone is selected for each control tile. For this example, the method coordinates the hopping patterns of the 3 control tiles so that each control tile is to be transmitted in a different resource zone. For example, in the first physical frame (indicated by numeral 314), control tile 0 (indicated by numeral 316) is to be transmitted in resource zone 0 (302), control tile 1 (indicated by numeral 318) is to be transmitted in resource zone 1 (304), and control tile 2 (indicated by numeral 320) is to be transmitted in resource zone 3 (308). In the second physical frame (indicated by numeral 322), control tile 0 (indicated by numeral 326) is to be transmitted in resource zone 2 (306), control tile 1 (indicated by numeral 324) is to be transmitted in resource zone 0 (302), and control tile 2 (indicated by numeral 328) is to be transmitted in resource zone 3 (308). This coordinated method of hopping guarantees that a certain level of frequency diversity between the 3 control tiles is achieved, while the control tiles are being hopped over a plurality of resource zones.

In a third example embodiment of the present invention, a distance vector may be defined for the K control tiles involved. The frequency separation between control tile 0 and control tile 1 may be defined as a distance value, $D_1$. Generally, in this regard, similar distance values may be defined for the frequency separations between any two of the control tiles. For example, the i$^{th}$ distance value, $D_i$, may be defined as the frequency separation between control tile (i−1) and control tile i, for i=0, . . . , K−1. Given this set of distance values, one hopping sequence can be provided for the entire set of control tiles. For example, assume that a total of N resources is available. Defining the resource channel ID of control tile 0 as $B_0$, then the resource channel ID of control tile 1 can be derived as $B_1 = \text{mod}((B_0+D_1), N)$, where mod(x, N) is the remainder of x divided by N.

Figure 4:
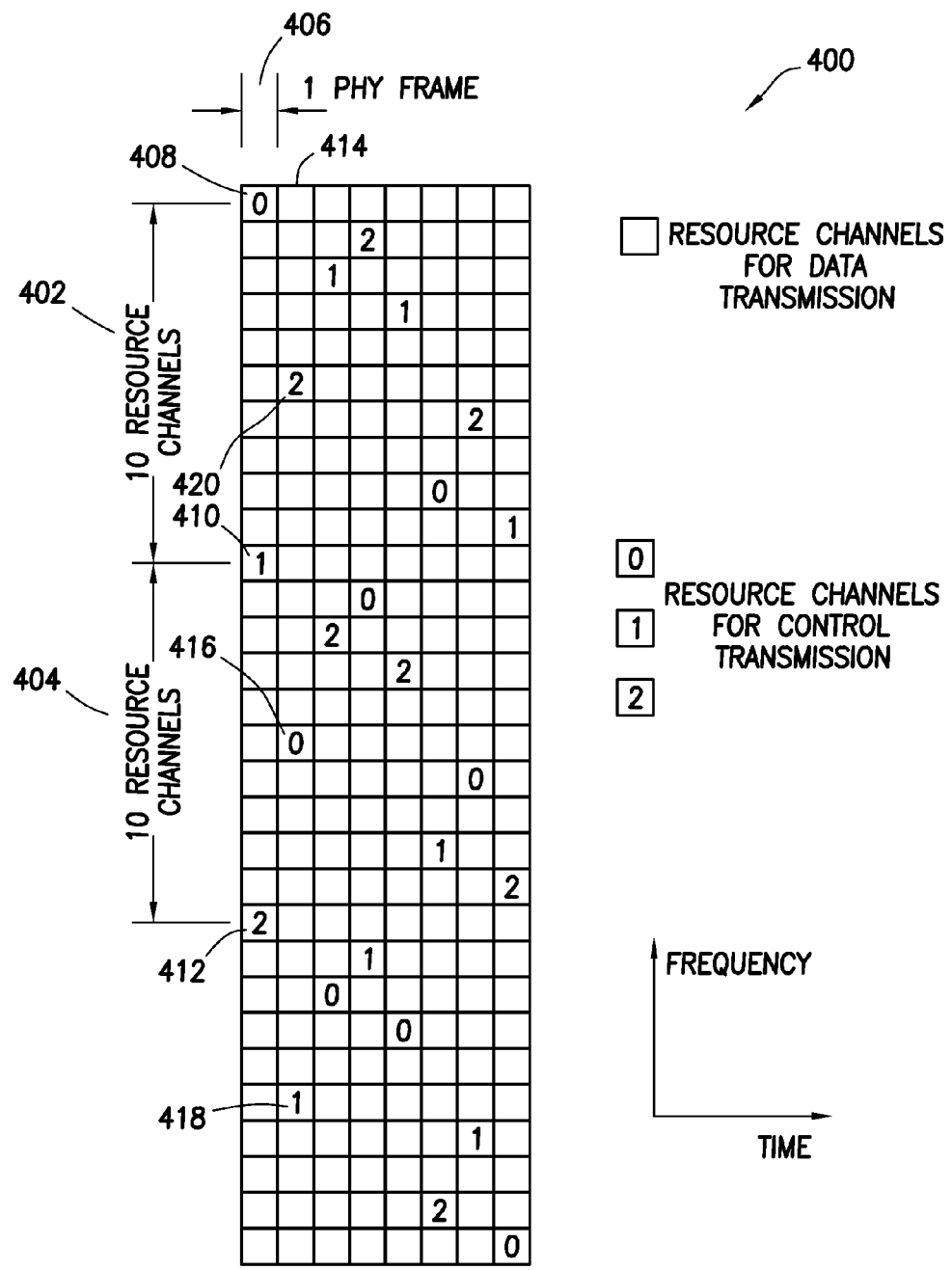
FIG. 4 is a pictorial diagram depicting an exemplary hopping sequence pattern that illustrates a method for coordinating the hopping of a plurality of channel segments, in accordance with a third example embodiment of the present invention.

In this regard, FIG. 4 is a pictorial diagram depicting an exemplary hopping sequence pattern 400 that illustrates a method for coordinating the hopping of a plurality of control tiles, in accordance with the above-described third example embodiment of the present invention. In accordance with the example method illustrated in FIG. 4, a first distance value is $D_1=10$ (indicated by the numeral 402), and a second distance value is $D_2=10$ (indicated by the numeral 404). In this illustrative example, the resources for transmitting control tile 1 and control tile 2 can be derived based on the location of control tile 0. For example, in the first physical frame 406, control tile 0 (408) is to be transmitted on resource channel 0. Consequently, according to the above-described distance relationships, control tile 1 (410) is to be transmitted on resource channel 10, and control tile 2 (412) is to be transmitted on resource channel 20. In the second physical frame 414, control tile 0 (416) is to be transmitted on resource channel 15. Consequently, control tile 1 (418) is to be transmitted on resource channel 25, and control tile 2 (420) is to be transmitted on resource channel 5.

In a different aspect of this example embodiment, the K control tiles may be divided into L subsets of control tiles, and distance values may be defined for the subsets of control tiles. Notably, these distance values do not have to be deterministic values or single values. For example, a range of distance values may be defined. Also, for example, the distance values in certain of the physical frames may be randomized.

Note again that as a straightforward extension of the present invention, the above-described embodiments may be used for other types of resources or channels on either reverse links or forward links, and also for wireless communication systems other than OFDMA systems.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A method for coordinating the hopping of a plurality of channel segments in a wireless communication system, comprising:
   determining, at a frame processing unit, a number of channel segments to include in each of a plurality of frames;
   dividing, at the frame processing unit, the frames into a plurality of resource zones to be used for hopping the plurality of channel segments, each resource zone containing a different plurality of contiguous frequency resource channels;
   assigning, at the frame processing unit, each channel segment to one of the resource zones, such that each channel segment is assigned to a different resource zone;
   selecting, at the frame processing unit, a first frequency resource channel within each assigned resource zone for transmitting the each channel segment in the assigned resource zone during a first frame of the plurality of frames; and
   selecting, at the frame processing unit, a second frequency resource channel within each assigned resource zone for transmitting the each channel segment in the assigned resource zone during a second frame following the first frame, wherein each first frequency resource channel is different than the corresponding second frequency resource channel.

2. The method of claim 1, wherein each frame of the plurality of frames comprises one physical frame in an Orthogonal Frequency Division Multiple Access (OFDMA) system.

3. The method of claim 1, wherein the channel segments are forward link control channel tiles.

4. The method of claim 1, wherein the channel segments comprise at least one of forward acknowledgment channels, forward start-of-packet channels, forward shared control channels, forward fast other sector interference channels, forward interference over thermal channels, forward pilot quality indicator channels, and forward power control channels.

5. The method of claim 1, wherein the channel segments comprise reverse link control channels.

6. The method of claim 1, wherein the channel segments comprise reverse acknowledgment channels.

7. The method of claim 1, wherein the channel segments are control tiles.

8. The method of claim 1, wherein the channel segments are forward link control segment tiles.

9. The method of claim 1, wherein the resource zones are forward link control segment hopping zones.

10. The method of claim 1, wherein the number of channel segments is equal to the number of resource zones.

11. The method of claim 1, wherein the number of channel segments is not equal to the number of resource zones.

12. The method of claim 1, wherein the number of channel segments is equal to 3, and the number of resource zones is equal to 3.

13. The method of claim 1, wherein the number of channel segments comprises a plurality of forward link control segment tiles, the number of resource zones comprises 3 forward link control segment hopping zones, and the plurality of forward link control segment tiles is divided into the 3 forward link control segment hopping zones.

14. The method of claim 1, wherein the wireless communication system comprises an OFDMA system.

15. The method of claim 1, wherein the number of frequency resource channels is equal to N, the channel segments are control tiles, a control channel uses K control tiles in each physical frame, the N resources are divided into M resource zones, and for each transmission of the control channel, one of the N resource zones is selected for each of the K control tiles.

16. A method for coordinating the hopping of N resources with K channel segments in a wireless communication system, the method comprising:
   defining, at a frame processing unit, a distance value, $D_i$, associated with a frequency separation between an $(i^{th}-1)$ channel segment and an $i^{th}$ channel segment, for i=0, . . . , K−1, wherein each distance value;
   defining, at the frame processing unit, a first resource unit identifier of a first channel segment 0 as $B_o$;
   defining, at the frame processing unit, a second resource unit identifier of a second channel segment 1 as $B_1$=mod $((B_0+D_1),N)$, where mod(x, N) represents a remainder of x divided by N;
   determining, at the frame processing unit, a first distance value, $D_1$, for a first channel segment located in a physical frame;
   determining, at the frame processing unit, a second distance value, $D_2$, for a second channel segment located in the physical frame; and
   deriving, at the location in the physical frame for a third channel segment based on the first distance value, $D_1$, the second distance value, $D_2$, and a relationship between the first resource unit identifier and the second resource unit identifier, such that each of the first, second, and third channel segment is assigned to a different resource zone..

17. The method of claim 16, wherein the N resources comprise N resource channels, and the K channel segments comprise 3 control tiles.

18. The method of claim 16, wherein the wireless communication system comprises an OFDMA system operating in accordance with the 3GPP2 air interface standard.

19. An apparatus for coordinating the hopping of a plurality of channel segments in a wireless communication system, comprising:
   a transmission unit; and
   a frame processing unit coupled to the transmission unit, wherein the frame processing unit is configured to:
      determine a number of channel segments to include in each of a plurality of physical frames;
      divide the physical frames into a plurality of resource zones to be used for hoping the plurality of channel segments, each resource zone containing a different plurality of continuous frequency resource channels;
      assign each channel segment to one of the resource zones, such that each channel segment is assigned to a different resource zone;
      select a first frequency resource channel within each assigned resource zone for transmission of the each channel segment in the assigned resource zone during a first physical frame of the plurality of physical frames;
      select a second frequency resource channel within each assigned resource zone for transmission of the each channel segment in the assigned resource zone during a second physical frame following the first physical frame, each first frequency resource channel being different than the corresponding second frequency resource channel; and couple the resource units including the each channel segment in the resource zone to the transmission unit.

20. The apparatus of claim 19, wherein the wireless communication system comprises an OFDMA system.

21. The apparatus of claim 19, wherein the wireless communication system comprises a system operating in accordance with the 3GPP2 air interface standard.

22. A method for a mobile terminal to receive a plurality of channel segments with coordinated hopping in a wireless communication network, comprising:
  determining, at a frame processing unit, a number of channel segments included in each of a plurality of frames;
  determining, at the frame processing unit, a unit of resource zones used for hopping the plurality of channel segments, each resource zone containing a different plurality of contiguous frequency resource channels;
  determining, at the frame processing unit, an assignment to one of the resource zones for each channel segment, such that each channel segment is assigned to a different resource zone;
  determining at the frame processing unit, a first frequency resource channel within each assigned resource zone for receiving the each channel segment in the assigned resource zone during a first frame of the plurality of frames;
  determining at the frame processing unit, a second frequency resource channel within each assigned resource zone for receiving the each channel segment in the assigned resource zone during a second frame following the first frame, wherein each first frequency resource channel is different than the corresponding second frequency resource channel; and
  receiving at the processing unit, signals from the frequency resource channel for the each channel segment.

23. An apparatus for a mobile terminal to receive a plurality of channel segments with coordinated hopping in a wireless communication network, comprising:
  a frame processing unit arranged in or associated with the mobile terminal, wherein the frame processing unit is configured to:
    determine how many channel segments are included in each of a plurality of physical frames;
    determine how many resource zones are used for hopping the plurality of channel segments, wherein each resource zone contains a different plurality of contiguous frequency resource channels;
    determine an assignment to one of the resource zones for each channel segment, such that each channel segment is assigned to a different resource zone;
    determine a first frequency resource channel within each assigned resource zone for receiving the each channel segment in the assigned resource zone during a first physical frame of the plurality of physical frames;
    determine a second frequency resource channel within each assigned resource zone for receiving the each channel segment in the assigned resource zone during a second physical frame following the first physical frame, each first frequency resource channel being different than the corresponding second frequency resource channel; and
  receive signals on the frequency resource channel for the each channel segment in the assigned resource zone.

* * * * *